March 27, 1934.     J. SCHICK     1,952,223

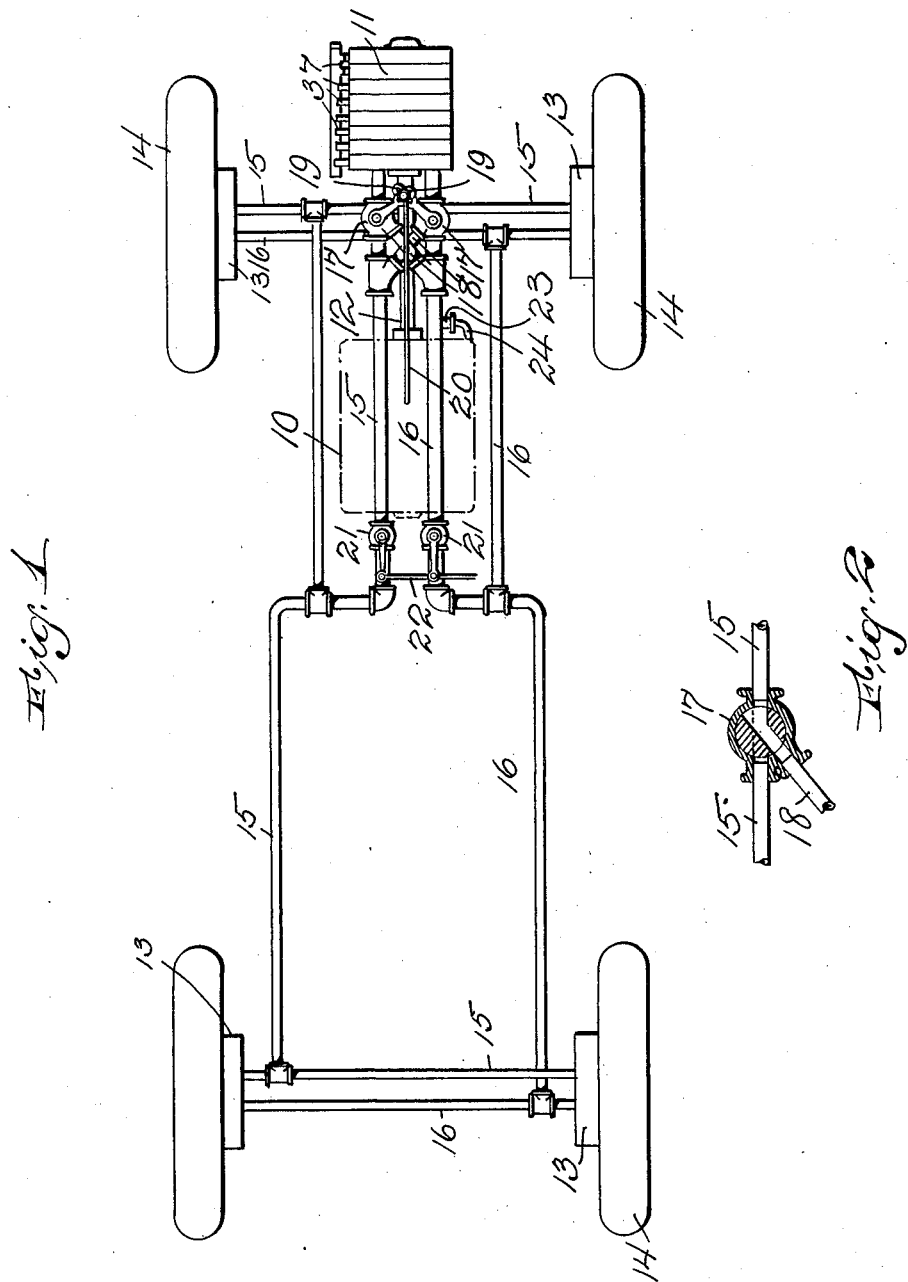

DRIVING MECHANISM FOR MOTOR VEHICLES

Filed Nov. 26, 1929     4 Sheets-Sheet 2

INVENTOR,
Jacob Schick
BY
Wm H Campbell
ATTORNEY

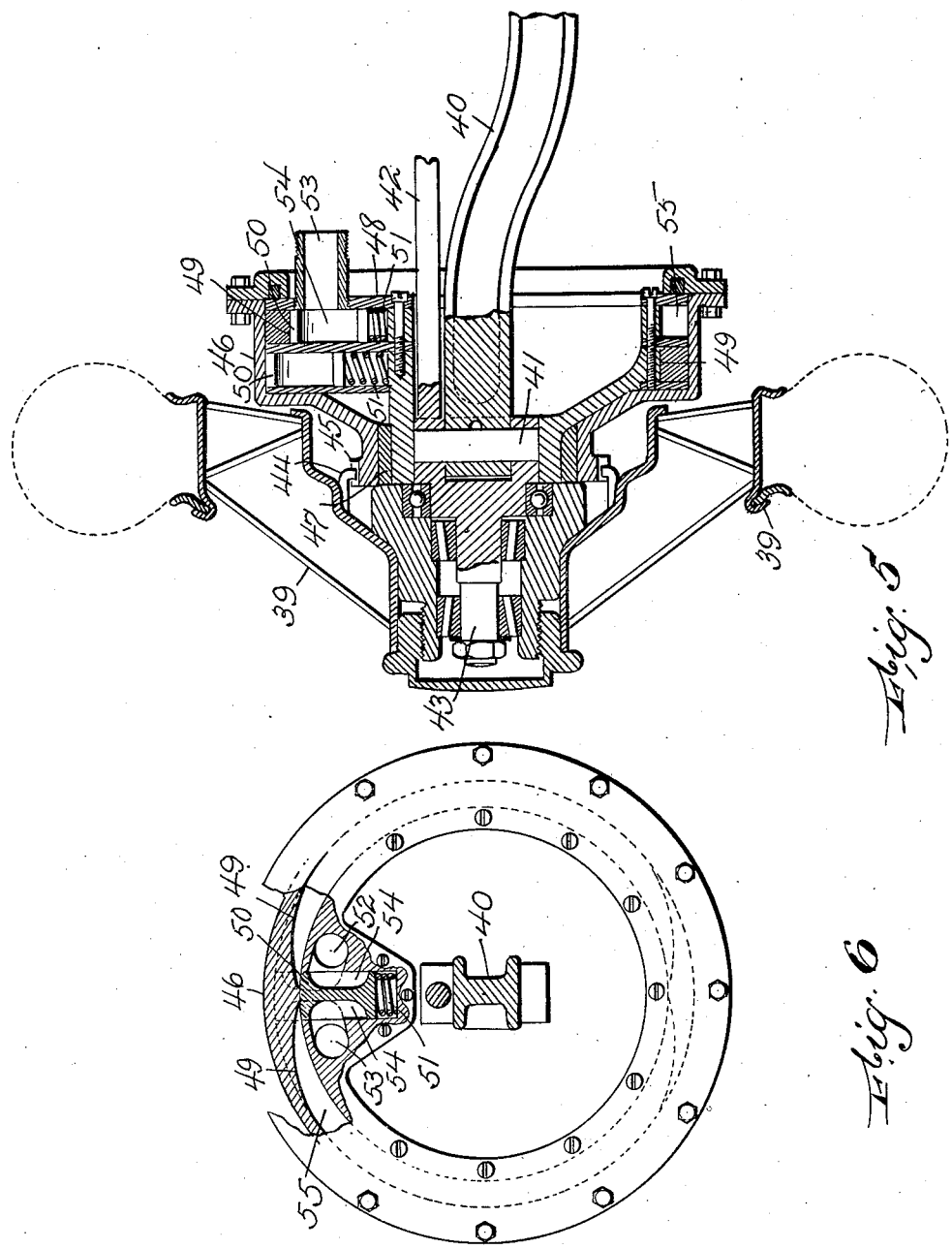

March 27, 1934.   J. SCHICK   1,952,223
DRIVING MECHANISM FOR MOTOR VEHICLES
Filed Nov. 26, 1929   4 Sheets-Sheet 4
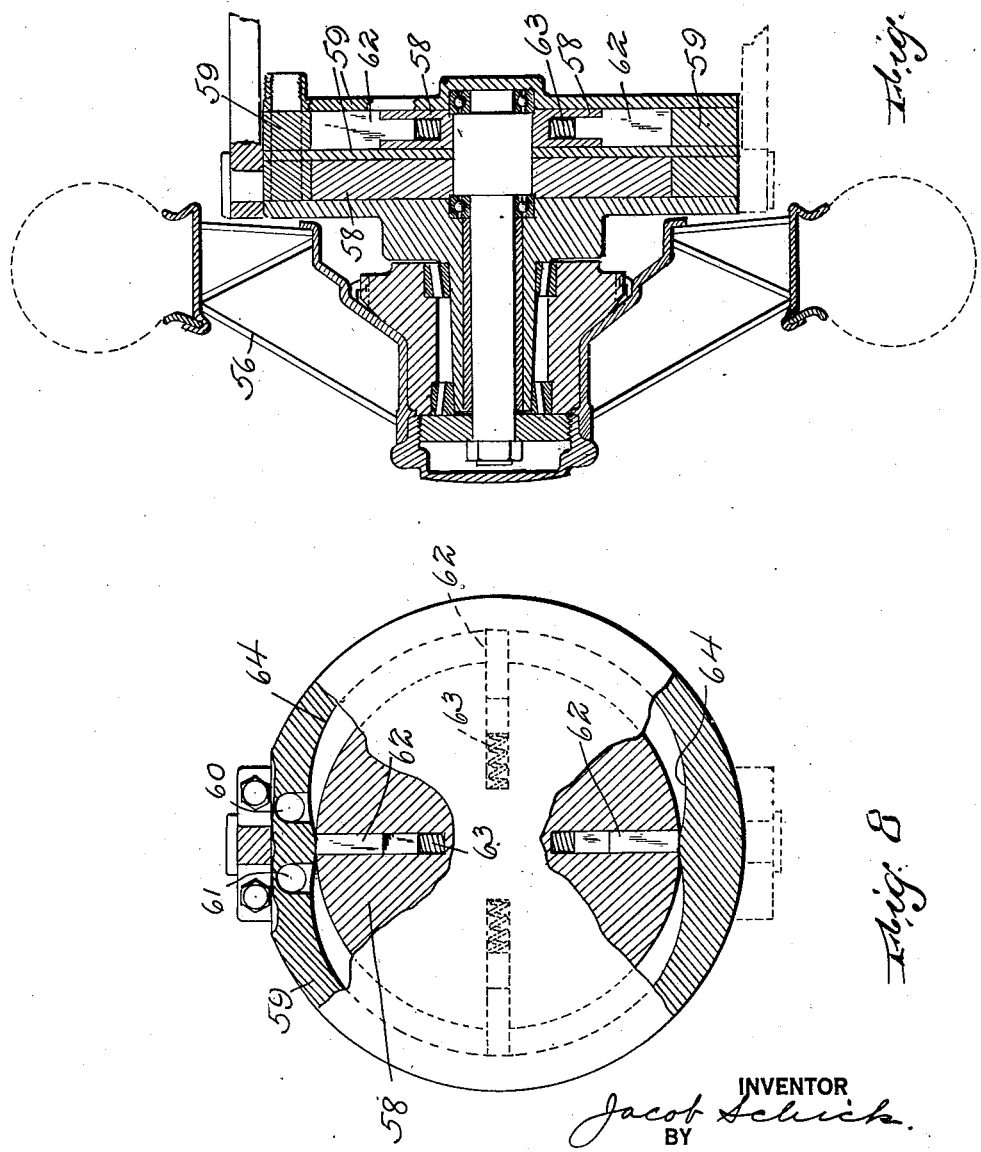

Patented Mar. 27, 1934

1,952,223

UNITED STATES PATENT OFFICE 1,952,223

DRIVING MECHANISM FOR MOTOR VEHICLES

Jacob Schick, Sound Beach, Conn., assignor to Schick Dry Shaver, Inc., a corporation of Delaware Application November 26, 1929, Serial No. 409,816

2 Claims. (Cl. 60—53)

This invention relates to an improved driving mechanism for motor vehicles and the like which mechanism includes a pump operated by a prime mover, a motor or motors disposed at the points desired, a system of pipes to co-operate with the aforesaid elements to form a closed channel for a fluid driving material, preferably oil.

The object of the invention is to provide a driving mechanism which operates smoothly and efficiently in low temperatures as well as in moderate or high temperatures, as the degree of viscosity or the temperature of the oil has no effect on the operation of the mechanism.

A further object of the invention is to provide a driving mechanism in which there is no reliance on centrifugal action and there are no vacuums requiring sump pumps or similar devices.

Another object is to provide a mechanism which acts as a reverse drive, as a brake, and can be operated as an idling mechanism with great facility.

The invention also has for its object the provision of a pump which can be quickly and easily enlarged or reduced in its power output as it is made up of units which are selectively or successively made to operate positively to the desired number to increase or decrease the speed or power of the vehicle.

Another feature of the invention is its combination with the crank-case of the engine by passing the oil pipes or lines through the crank-case of the engine to keep a moderate temperature in the crank-case oil and further to provide a check-valve connection from the crank-case to the return pipe of the system in order to automatically supply any deficiency of oil in the system from the oil in the crank-case. The cooling of the crank case oil is due to the function of the pipes, which are connected to the motor at the wheels, as radiators to dissipate the heat. The exposure of these pipes in travel due to their length tends to cool the transmission oil to an extent that enables it to act as a cooling agent on the oil in the crank case.

Figure 4:
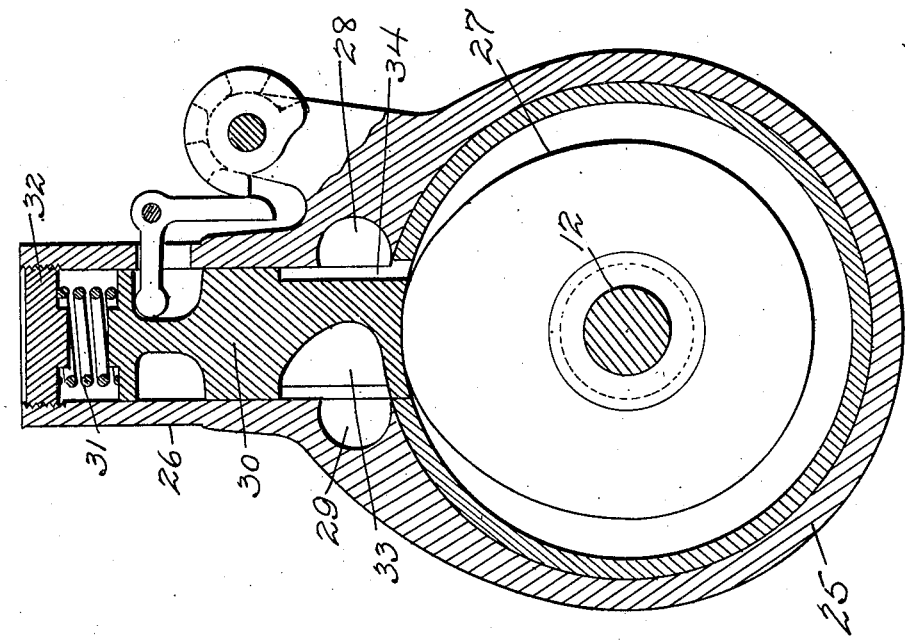
Figure 5:
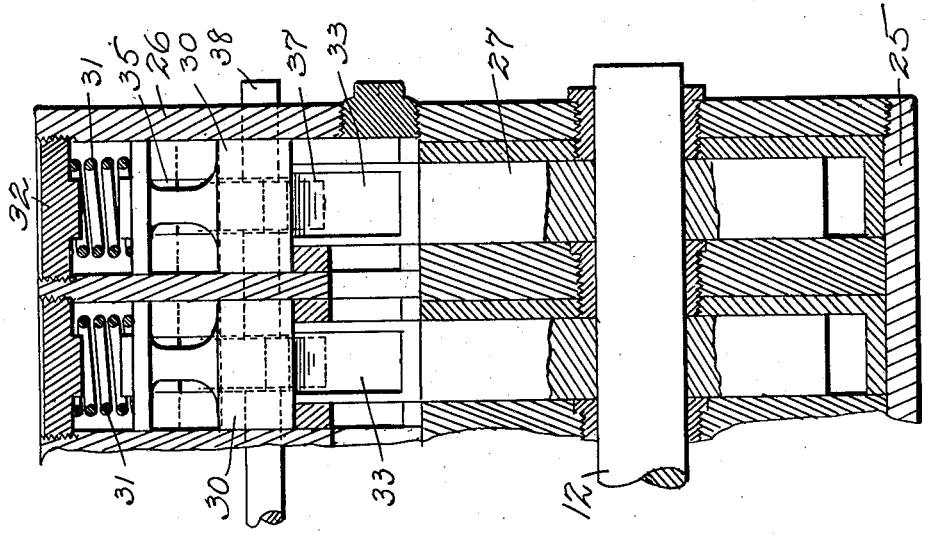

The invention is illustrated in the accompanying drawings which show a driving mechanism embodying my invention. In said drawings, Figure 1 is a diagrammatic view showing the elements which constitute my invention and also showing the wheels of the vehicle. Figure 2 is a detail section of a valve used in the reversing means. Figure 3 is a longitudinal section and Figure 4 is a cross-section of a pump used in the driving mechanism. Figure 5 is a cross-section of a motor and illustrating the wheel on which it is mounted. Figure 6 is a rear view, partly in section of the motor shown in Figure 5. Figure 7 is a cross-section of another form of motor and also showing the wheel. Figure 8 is a rear view partly in section of the motor shown in Figure 7.

In the drawings I show a diagrammatic view in Figure 1 which view shows the engine in broken lines at 10. This engine is the prime mover and may be of any desired form. The engine drives the pump 11 by means of the shaft 12. The pump is made up of units and I show and expect to use eight units as a typical pump. The pump is connected by a set of power lines or pipes to the motors 13. I show a motor on each wheel 14. The power line is at 15 and the return line or pipe at 16. The oil or other fluid used for power is forced by the pump 11 to the motors 13 through the pipes 15 and is returned to the pump through the line 16. This is for normal forward movement. I provide a cross-over valved connection to reverse the direction of flow to the motors in order to act as a reverse propulsion medium. The valves 17 are typical of such connection and are placed in the pipes 15 and 16 and also connect with the separate cross-over pipes 18. They are operated in unison by the levers 19 connected to a rod 20 or similar connection to the driver's seat (not shown).

When the mechanism is to be used as a brake the pipes 15 and 16 are partly shut by the valves 21 operated together by the rod 22. The variation or control of the capacity of the pipes retards or relieves the flow of fluid and thus a braking means is provided.

The whole channel for oil which includes the pump, motor and piping is a closed channel and is kept full of oil at all times. This may be done automatically by the check valve 23 connected by a pipe 24 with the oil supply in the crank-case. The oil can flow from the crank-case to the return pipe 16 but can not return. The pipes 15 and 16 are conducted through the crank-case and thus serve to keep the oil in the crank-case at a moderate temperature.

The preferred form of pump is shown in Figures 3 and 4. The pump consists of units and I show two of them. They are arranged side by side and the shaft 12 operates all of them together.

Each unit comprises a cylindrical casing 25 with an extension 26. In each cylindrical casing and mounted on the shaft 12 is a rotor 27. The rotor is eccentric on the shaft or is in the form of a cam and when it revolves it carries with it the oil which is in front of it. The casing has an inlet duct 28 connected with the return pipe 16 and an outlet duct 29 connected to the pipe 15. In the extension 26 of each unit is a slide 30 pushed outwardly by the rotor 27 and moved inwardly by the spring 31 which abuts on the slide 30 and on a cap 32 in the top of the extension. As the high point of the rotor pushes the slide out it closes the outlet port or duct and there is no flow of oil. When the high point passes the slide the slide moves in and as it has a channel or recess 33 it connects the inside of the cylinder with the outlet duct 29 and as the rotor revolves it forces the oil which passes in through the channel 34 from the inlet duct 28 around in the casing and out through the outlet duct into the power line 15 and so to the motors 13.

Each of the slides 30 can be made inactive and held up to form a closure. The means I show for doing this is a bell crank having an arm 35 to engage the slide to hold it out and an arm 36 to be engaged by a stop 37 rotatable by the shaft 38. I stagger or set back these stops as shown in Figures 1 and 4. They are arranged to move the first two units in unison. They act together to form the lowest available operation but the other six units are operated singly in succession to enable the effective flow and power to be gradually increased or decreased as will be evident.

One form of motor is shown in Figures 5 and 6. In this form the rotor is arranged in the outer part of the motor and the central part is secured against rotation. I show a front wheel 39 mounted on the axle 40, pivoted on the king-pin 41 and steered by the arm 42. Any other suitable form of mounting can be employed. The end 43 of the axle 40 supports the hub of the wheel 39 and the wheel is fitted by keys 44 and the slots 45 to the rotor 46. The rotor revolves on the bearing 47 and encloses the outer portion of the fixed member 48. The rotor has cam-surfaces 49 which act as pistons and also act to push in the slides 50 in the fixed member. Springs 51 act to push the slide or slides outwardly. In the form illustrated I show two motors, or rather units, to make up one motor, side by side and with the cams 49 diametrically opposed in order to have one slide out while the other is in. This arrangement can be enlarged or multiplied as required. The inlet port 52 is connected with the power line 15 and the outlet port 53 is connected with the return line 16. The slide 50 has the channels 54 on each side. When the slide is pushed in by the cam surface 49 it seals or closes the inlet and outlet ports. When the cam has passed, the slide is pushed out and acts as a conducting means for delivering oil from the inlet duct which acts to force the cam-surface and therefore the rotor around the fixed member 48. It also acts as a conducting means for the oil on its return to the outlet port 53. The slide 50 thus acts as a closure when in and as a directing and conducting means when pushed outwardly. The staggering of the cam surfaces 49 of the two units makes the operation of the motor smooth. In Figure 6, I show the slide as pushed in and by dotted lines the other slide is shown pushed out and forming a connection or channel between the inlet and outlet ports and the chamber 55 of the motor.

In Figures 7 and 8, I show another form of motor in which the rotor carrying the wheel is inside or within the casing. In this form I illustrate a wheel 56 on the rotatable axle 57. The rotor 58, of which I show two, side by side, is carried around in the fixed casing 59 by the oil entering through inlet port 60 connected to pipe 15 and outlet port 61 connected to the return line 16. The oil acts on the slide 62 which forms a piston and is pushed outwardly by a spring 63. The casing 59 has the cam surfaces 64 which act as abutments, are located between the inlet and outlet ports and push the slides 62 inwardly as they pass over the space between the inlet and outlet ports. The slides and cam-surfaces can be installed to the desired number but I prefer two opposed sets in each unit or chamber of the motor and one set at right angles to the other. This arrangement is shown in Figure 8.

Various modifications can be made in the various parts without departing from the scope of the invention as defined in the claims.

I claim:—

1. A driving mechanism for motor vehicles comprising a closed channel for a fluid, said channel including a pump and also including a motor with power and return lines connecting them whereby continuous pressure can be applied to the motor from the pump in combination with an engine for driving the pump, the engine including a crank case through which the lines pass.

2. A driving mechanism for motor vehicles comprising a closed channel for a fluid, said channel including a pump and also including a motor with power and return lines connecting them whereby continuous pressure can be applied to the motor from the pump in combination with an engine for driving the pump the engine including a crank case through which the lines pass and a check valve connecting the return line and the crank case to provide feeding of oil to the system from the crank case.

JACOB SCHICK.